US009902383B2

(12) United States Patent
Larequi et al.

(10) Patent No.: US 9,902,383 B2
(45) Date of Patent: Feb. 27, 2018

(54) MASTER BRAKE CYLINDER ARRANGEMENT FOR A MOTOR VEHICLE BRAKE SYSTEM, AND INTEGRAL SEALING THROTTLE ELEMENT FOR THE SAME

(71) Applicant: Lucas Automotive GmbH, Koblenz (DE)

(72) Inventors: David Lopéz Larequi, Koblenz (DE); Hans-Martin Giese, Polch (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 481 days.

(21) Appl. No.: 14/394,155

(22) PCT Filed: Mar. 5, 2013

(86) PCT No.: PCT/EP2013/054359
§ 371 (c)(1),
(2) Date: Oct. 13, 2014

(87) PCT Pub. No.: WO2013/152895
PCT Pub. Date: Oct. 17, 2013

(65) Prior Publication Data
US 2015/0113977 A1    Apr. 30, 2015

(30) Foreign Application Priority Data

Apr. 12, 2012 (DE) .................. 10 2012 007 380

(51) Int. Cl.
*B60T 11/22* (2006.01)
*B60T 11/26* (2006.01)
(52) U.S. Cl.
CPC ............... *B60T 11/22* (2013.01); *B60T 11/26* (2013.01)
(58) Field of Classification Search
CPC ................................. B60T 11/22; B60T 11/26
(Continued)

(56) References Cited

U.S. PATENT DOCUMENTS 5,937,649 A    8/1999  Barz et al.
6,438,955 B1   8/2002  Chiba et al.
(Continued)

FOREIGN PATENT DOCUMENTS

EP    2039574 A1    3/2009
EP    2216220 A1    8/2010
(Continued)

OTHER PUBLICATIONS

PCT International Search Report, Application No. PCT/EP2013/054359, dated Sep. 13, 2013.
(Continued)

*Primary Examiner* — F. Daniel Lopez
*Assistant Examiner* — Daniel Collins
(74) *Attorney, Agent, or Firm* — MacMillan, Sobanski & Todd, LLC (57) ABSTRACT

A master brake cylinder arrangement (10) for a motor vehicle brake system, comprising a master brake cylinder housing (12) with a cylindrical recess (28), at least one pressure piston (30, 32) which is displaceable and sealingly guided in the cylindrical recess (28) of the master brake cylinder housing (12), a fluid reservoir (14) which is fluidically coupled to the master brake cylinder housing (12) via a connecting region (22) and which serves for storing brake fluid, wherein the at least one pressure piston (30, 32) together with the master brake cylinder housing (12) sealingly encloses a pressure chamber (38, 40) which, as a function of the position of the associated pressure piston (30, 32), is fluidically connected to or separated from the fluid reservoir (14), wherein furthermore the at least one pressure chamber (38, 40) can be or is fluidically coupled to a fluid circuit of the motor vehicle brake system, wherein the fluid reservoir (14) in the connecting region (22) is received, in a manner sealed by means of a sealing element (62), in a
(Continued)

receiving portion (26) of the master brake cylinder housing (12), and wherein at least one throttle element (66) is provided in the connecting region (22), which throttle element as a function of the pressure conditions in the at least one pressure chamber (38, 40) throttles or derestricts the fluid stream between the fluid reservoir (14) and the at least one pressure chamber (38, 40) through the connecting region (22). In said master brake cylinder arrangement it is provided that the at least one throttle element (66) is combined with the sealing element (62) so as to form an integral structural unit.

13 Claims, 5 Drawing Sheets

(58) Field of Classification Search
USPC .......................................................... 60/585

See application file for complete search history.

(56) References Cited

U.S. PATENT DOCUMENTS

| | | |
|---|---|---|
| 6,637,201 B2 | 10/2003 | Hirayama et al. |
| 2005/0231028 A1 | 10/2005 | Tsubouchi et al. |
| 2005/0235642 A1 | 10/2005 | Tsubouchi et al. |
| 2008/0276612 A1 | 11/2008 | Egawa |
| 2009/0195059 A1 | 8/2009 | Taira |
| 2012/0204554 A1* | 8/2012 | Takahashi ............. B60T 11/232 60/585 |

FOREIGN PATENT DOCUMENTS

| | | |
|---|---|---|
| GB | 2087018 A | 5/1982 |
| WO | 2007135966 A1 | 11/2007 |
| WO | WO 2011052151 A1 * | 5/2011 ............. B60T 11/232 |

OTHER PUBLICATIONS

PCT International Preliminary Report on Patentability, Application No. PCT/EP2013/054359, dated Apr. 16, 2014.

* cited by examiner

MASTER BRAKE CYLINDER ARRANGEMENT FOR A MOTOR VEHICLE BRAKE SYSTEM, AND INTEGRAL SEALING THROTTLE ELEMENT FOR THE SAME

CROSS-REFERENCE TO RELATED APPLICATIONS

This application is the National Phase of International Application PCT/EP2013/054359 filed Mar. 5, 2013, which designated the U.S. That International Application was published in English under PCT Article 21(2) on Oct. 17, 2013 as International Publication Number WO 2013/152895A1. PCT/EP2013/054359 claims priority to German Application No. 10 2012 007 380.1 filed Apr. 12, 2012. Thus, the subject nonprovisional application also claims priority to German Application No. 10 2012 007 380.1 filed Apr. 12, 2012. The disclosures of both applications are incorporated herein by reference.

BACKGROUND OF THE INVENTION

The present invention relates to a master brake cylinder arrangement for a motor vehicle brake system, comprising:
a master brake cylinder housing with a cylindrical recess, at least one pressure piston which is displaceable and sealingly guided in the cylindrical recess of the master brake cylinder housing,
a fluid reservoir which is fluidically coupled by a connecting region to the master brake cylinder housing and which serves for storing brake fluid,
wherein the at least one pressure piston together with the master brake cylinder housing sealingly encloses a pressure chamber which, as a function of the position of the pressure piston, is fluidically connected to or separated from the fluid reservoir, wherein furthermore the pressure chamber can be or is fluidically coupled to a brake circuit of the motor vehicle brake system, wherein the fluid reservoir in the connecting region is received, in a manner sealed by means of a sealing element, in a receiving portion of the master brake cylinder housing and wherein at least one throttle element is provided in the connecting region, which throttle element as a function of the pressure conditions in the pressure chamber throttles or derestricts the fluid stream between the fluid reservoir and the pressure chamber through the connecting region.

This master brake cylinder arrangement takes account of the following situation: in an initial state prior to actuation of the brake, in which the pressure piston is preloaded into an initial position by a resetting spring, there is a fluidic connection between the fluid reservoir and the pressure chamber delimited by the pressure piston. This fluidic connection is guaranteed by means of holes in a hollow-cylindrical portion of the pressure piston, wherein these holes in the initial position are situated in a region between two peripheral seals that surround the pressure piston. If from this position the brake system is actuated, the pressure piston is displaced accordingly in the master brake cylinder housing. However, so long as the connecting bores in the hollow-cylindrical portion of the pressure piston have not yet moved completely past an associated peripheral seal, such that a fluidic connection still exists between the pressure chamber and the fluid reservoir, the result is temporarily a delayed pressure build-up. The speed at which pressure is built up in the brake circuit depends on the respective volume of the leakage stream, i.e. the volume of brake fluid that is able to flow off through the not yet completely closed holes into the fluid reservoir. In addition, angular flexibility and friction of the peripheral seal on the pressure piston lead to dynamic variations of the size of the connecting gaps and hence to likewise dynamically varying leakage streams and leakage volumes, which in this transitional phase may lead to an oscillating or pulsating pressure build-up. This may possibly be perceived by the driver in the course of the brake actuation.

In order to combat these instabilities during the pressure build-up, the throttle element described in the introduction is provided. It is displaced as a function of the actually prevailing pressure and throttles a leakage stream, thereby allowing brake pressure to be built up faster and more uniformly in the pressure chamber. As a function of the actually prevailing pressure conditions in the connecting region between fluid reservoir and pressure chambers the throttle element may occupy different functional positions. If for example in an emergency braking situation a fast and—in terms of amount—steep pressure build-up is necessary by means of a rapid displacement of the pressure piston, the throttle element should effect maximum throttling of the return flow of brake fluid from the pressure chamber into the fluid reservoir. On the other hand, if a follow-up flow of brake fluid from the fluid reservoir is needed, for example if a function of a traction control system requires brake fluid from the fluid reservoir, the throttle effect should be as low as possible.

Master brake cylinder arrangements with such throttle elements are prior art. For example, the document U.S. Pat. No. 6,637,201 B2 discloses such a master brake cylinder arrangement with two pressure pistons, which are guided in the master brake cylinder housing. As regards the throttle effect, the prior art cited above provides an arrangement comprising freely movable, separately constructed throttle flaps. This arrangement is of a relatively complicated construction and has the drawback that, because of the separate construction of the throttle flaps, it is susceptible to incorrect assembly. Furthermore, precisely this separate construction of the throttle flaps may lead to their jamming or canting and hence no longer functioning properly.

The document EP 2 039 574 A1 discloses a similar form of construction having the same object of creating different throttle situations for the fluid stream between the fluid reservoir and the pressure chamber as a function of the pressure conditions actually prevailing in the connecting region. In this case the previously described problem of the separate, freely movable throttle flaps is taken into account in that the throttle flaps are in each case mounted pivotably by means of a type of hinge arrangement on one of the connecting sockets. However this solution is also of a complex construction and hence relatively cost-intensive. Its assembly moreover requires great care in order to prevent installation faults.

Finally, the document US 2008/0276612 A1 discloses a relatively complex throttle arrangement, which is mounted in and around a connecting socket of the fluid reservoir. The variety of parts and the arrangement in the connecting socket alone call for comprehensive assembly measures, which makes the arrangement cost-intensive.

SUMMARY OF THE INVENTION

The underlying object of the invention is to provide a master brake cylinder arrangement of the type described in the introduction, which combines a reliable mode of operation with a construction that is markedly simpler and hence more economical than the prior art.

This object is achieved by a master brake cylinder arrangement of the type described in the introduction, in which it is provided that the at least one throttle element is combined with the sealing element so as to form an integral structural unit.

The master brake cylinder arrangement according to the invention likewise comprises a throttle element, which as a function of the pressure conditions prevailing in the connecting region throttles or derestricts the fluid stream between the fluid reservoir and the at least one pressure chamber. In a departure from the cited prior art however this function, which is necessary for stabilizing the pressure build-up, is provided not by complex multi-part arrangements that require comprehensive manufacturing- and assembly measures. Instead, the invention provides that the sealing element, which is in any case needed to seal the interface between the master brake cylinder housing and the fluid reservoir, is configured together with the throttle element as an integral structural unit. In other words, a single component that performs both the sealing function and the throttling function is therefore provided. There is no need to carry out constructional measures on the fluid reservoir itself or on the master brake cylinder housing. Both functions may be integrated in the structural unit according to the invention.

Developments of the invention are described below with reference to the dependent claims.

A development of the invention provides that the fluid reservoir has at least one connecting socket with a through-opening, which connecting socket in the assembled state projects into the receiving portion of the master brake cylinder housing, wherein between the connecting socket and a sealing surface of the receiving portion of the master brake cylinder housing the sealing element is sealingly disposed.

In this case it may be provided that the throttle element comprises a throttle body, which in accordance with the pressure conditions prevailing in its environment is movable relative to the through-opening of the connecting socket. In particular, in this connection it is possible that the throttle body is coupled by at least two flexible connecting webs to the sealing element.

The throttle characteristics of the throttle element are to be selected in dependence upon the requirements profile of the brake system, in which the master brake cylinder arrangement according to the invention is installed. To enable an adaptation of the throttle effect to the respective requirements profile, different structural units may be used. In this case, a development of the present invention provides that the mobility of the throttle body relative to the through-opening of the connecting socket is adjustable by means of the number, geometric design and the material of the connecting webs.

According to the invention it may be provided that the throttle body is of a disk-shaped or bell-shaped configuration. A disk-shaped configuration of the throttle body offers the advantage of easier manufacture. In the case of a bell-shaped configuration of the throttle body it is possible for a part of the bell shape to project into the through-opening of the connecting socket, with the result that a more reliable mode of operation, on the one hand, and a purposeful influencing of the throttle effect may be achieved. Also, depending on the throttle effect to be achieved, the geometry of the bell shape may be modified. For example, the crown of the bell may be designed with more or less pronounced rounding, possibly even with a point, so that in an extreme case a conical shape arises. Preferably it may be provided that the throttle element at least partially or completely covers the through-opening of the connecting socket in throughflow direction, given selection of a viewing direction as-it-were frontally towards (at right angles to) the effective throttle surface of the throttle element. In this case, it is in particular possible for the throttle element to open or substantially close the through-opening of the connecting socket in accordance with the pressure conditions prevailing in its environment.

According to the invention it may further be provided that the sealing element comprises a collar portion, by which it is supported in a positioning manner on an edge region surrounding the receiving portion. This collar portion therefore ensures a setpoint positioning during assembly and prevents the sealing element from being pressed too far into the receiving portion of the master brake cylinder housing.

A development of the invention that is particularly easy to manufacture and assemble arises for example when the structural unit comprising the sealing element and the throttle element comprises an integral resilient body that is formed with an annular portion or shank portion, wherein the annular portion and/or shank portion is disposed sealingly between the sealing surface of the receiving portion and the connecting socket. Such a resilient body is easy to manufacture by inject moulding and comprises both functional components that are central to the invention, namely a seal on the one hand and a throttle element on the other hand.

According to the invention it may further be provided that the sealing surface of the receiving portion is of a profiled construction and that the annular portion has a surface with a complementary profile, wherein the profiled sealing surface of the sealing portion may be moved into engagement or is in engagement with the surface of the annular portion with a complementary profile. This results in advantageous properties for the air- and fluid-tight sealing of the connecting region relative to the environment. In particular, in this connection it is possible for the profiled sealing surface of the receiving portion to have at least one undercut, into which the surface of the annular portion with a complementary profile engages.

The invention further relates to an integral structural unit, comprising at least one throttle element for throttling a fluid stream as well as a sealing element for sealing the interface between a fluid reservoir and a master brake cylinder housing of a master brake cylinder arrangement of the previously described type.

The invention is described by way of example with reference to the accompanying figures, which show:

DETAILED DESCRIPTION OF THE PREFERRED EMBODIMENTS

Figure 1:
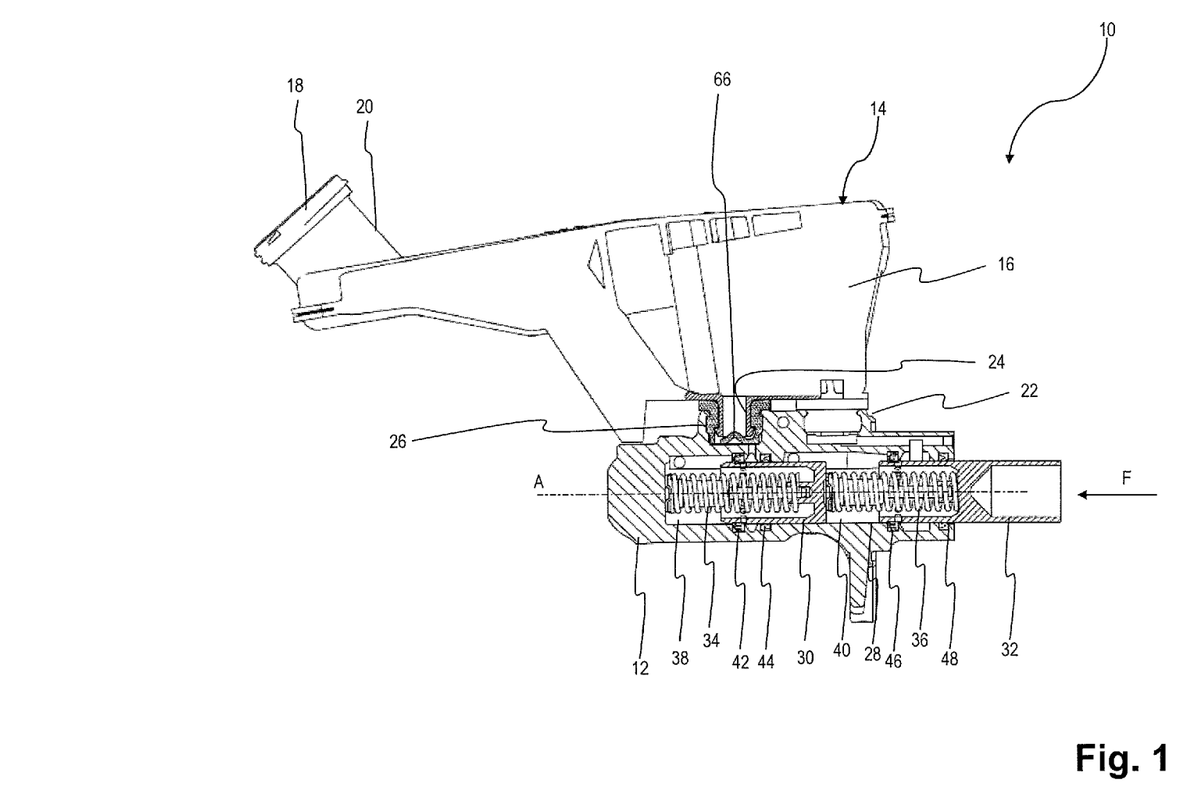
FIG. 1 a side view of a master brake cylinder arrangement according to the invention, in which the master brake cylinder housing is shown in an axis-containing sectional view.

In FIG. 1 a master brake cylinder arrangement for a motor vehicle brake system according to the present invention is shown and designated generally by 10. The master brake cylinder arrangement 10 comprises a master brake cylinder housing 12 and a fluid reservoir 14 for receiving brake fluid. The fluid reservoir 14 comprises a storage body 16 with a storage volume as well as a filler neck 20 that is closable by means of a stopper 18. The fluid reservoir 14 is connected by a connecting region 22 to the master brake cylinder housing 12. In this connecting region 22 two connecting sockets 24 project from the fluid reservoir 14 into associated receiving openings 26, which are provided in the master brake cylinder housing 12.

The master brake cylinder housing 12 further comprises a cylindrical recess 28, in which two pressure pistons 30, 32 are accommodated in a displaceable manner. Each of the two pressure pistons 30, 32 is preloaded by a resetting spring 34, 36 into an initial position that is shown in FIG. 1. The two pressure pistons 30, 32 together with the inner surface of the cylindrical recess 28 enclose in each case pressure chambers 38, 40. For this purpose seal pairs 42, 44 and 46, 48 are provided in the master brake cylinder housing 12.

Figure 2:
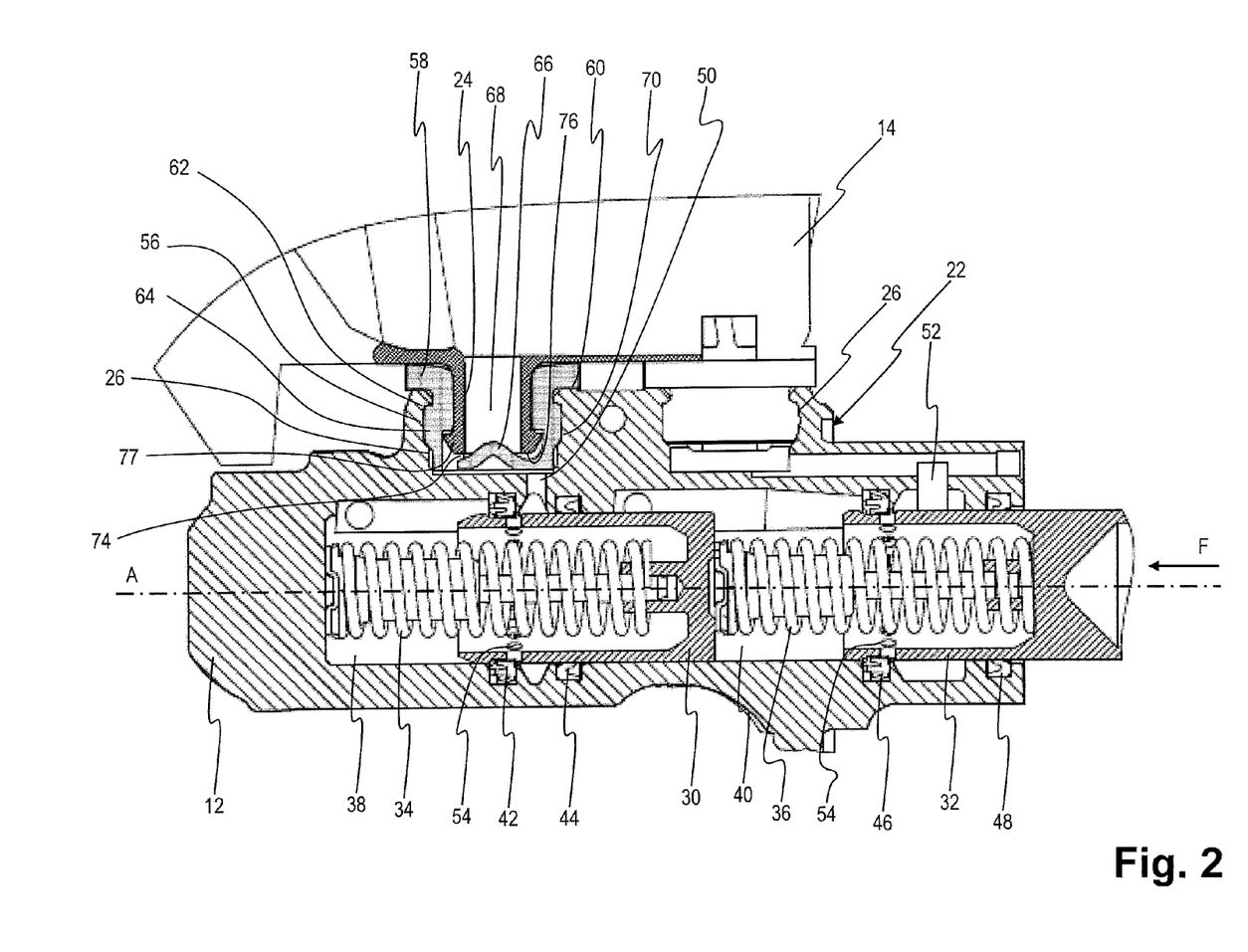
FIG. 2 an enlarged partial view of the representation according to FIG. 1.

As may be seen in detail in FIG. 2, the two seals 42, 44 and 46, 48 of the two seal pairs are disposed in each case at a distance from one another. Running in the gap between these two seals 42, 44 and/or 46, 48 there is in each case a fluid channel 50, 52 that is fluidically connected to the connecting region 22. It is evident that the two pressure pistons 30, 32 are provided with radial through-openings 54, which in the position shown in FIG. 2 provide a fluidic connection between the associated fluid channel 50, 52 and the pressure chamber 38, 40.

It is further evident that the connecting socket 24 is accommodated in the receiving opening 26, wherein a stopper-shaped component 56 is inserted into the receiving opening 26 and sealingly receives the connecting socket 24. The component 56 comprises a collar 58, which is supported on an edge 60 that surrounds the receiving opening 26. From the collar 58 a shank portion 62 with a radially extending annular projection 64 extends into the receiving opening 26. Formed onto the shank portion 62 is a bell-shaped throttle element 66, which with its crown portion projects into a region of a through-opening 68 of the connecting socket 24. The receiving opening 26 of the master brake cylinder housing 12 has an inside circumference profile with an annular recess 70, which inside circumference profile corresponds to the outside circumference profile of the shank portion 62.

Figure 5:
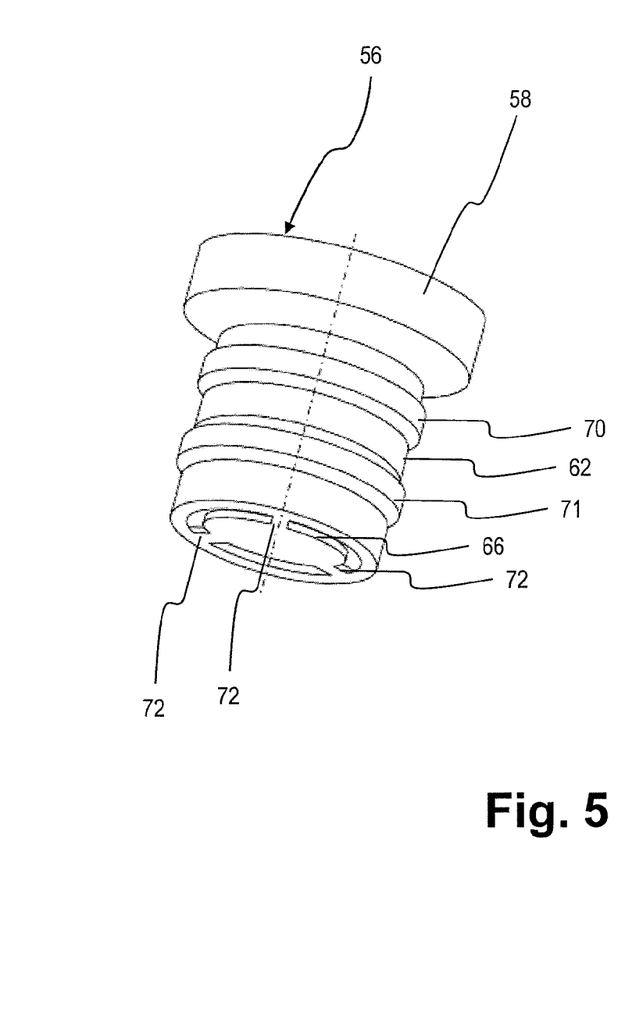
FIGS. 5 and 6 perspective single-part views of two embodiments forming structural units with sealing function and throttle function according to the present invention.
Figure 6:
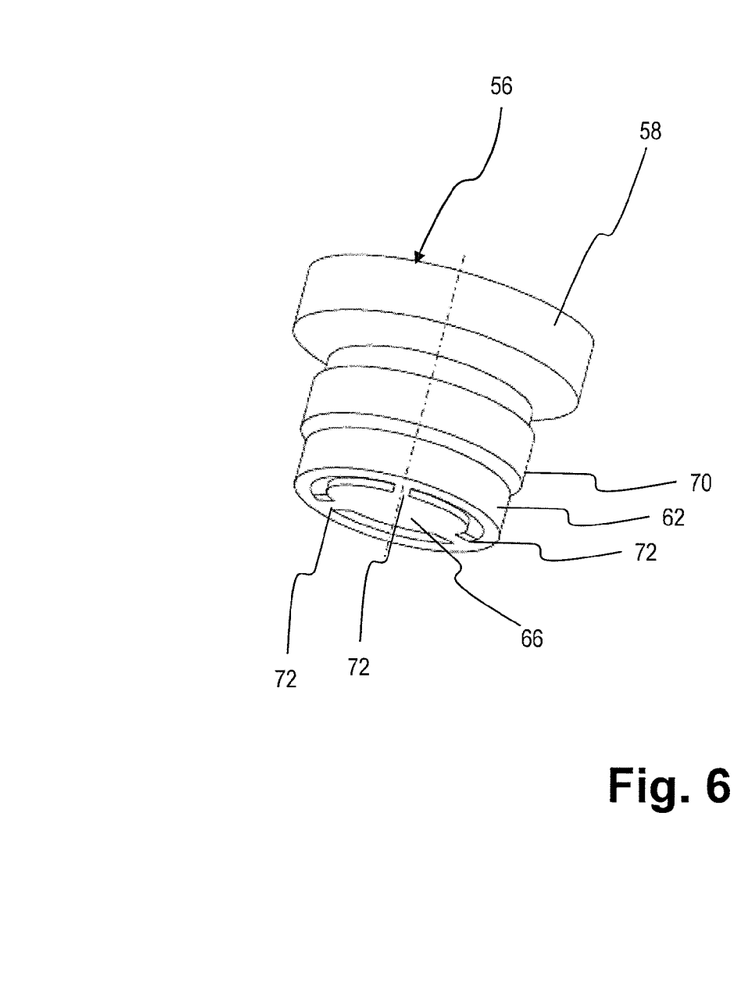

Turning to the component 56 and considering the single-part drawings according to FIGS. 5 and 6 it is evident that, there, the throttle element 66 is connected by three webs 72 to the shank portion 62. Similarly, the bell-shaped throttle element 66 in the embodiment according to FIGS. 1 and 2 is also mounted on the shank portion 62. The webs 72 are flexible and allow a relative movement of the throttle element 66 relative to the shank portion 62. It should be noted that in the embodiment according to FIG. 5, instead of one radial projection 70, two radial projections 70, 71 are provided on the shank portion 62.

Looking once more at FIG. 2, it is evident that the throttle element 66 in the state of rest is disposed with a clearance 74 relative to the end face 76 at the free end of the connecting socket 24. Furthermore, provided below the throttle element 66 there is as-it-were a gap 78. The throttle element 66 therefore has a specific range of motion in an upward and downward direction before it strikes during a relative movement relative to the shank portion 62.

Finally it should be noted that the connecting socket 24 at its free end is constructed with a circumferential wedge-shaped projection 77 for latching in the stopper 56.

When in operation the master brake cylinder arrangement 10 according to the invention according to FIGS. 1 and 2 functions as follows:

Upon an actuation of the brake the two pressure pistons 30, 32 are displaced by a force F to the left along the longitudinal axis A in FIGS. 1 and 2. In the brake fluid contained in the pressure chambers 38 and 40 a pressure is built up and is to be used to achieve a braking effect in the non-illustrated brake circuit of the motor vehicle. However, so long as there is still a connection to the fluid channels 50, 52 via the radial holes 54 in the pressure pistons 30, 32, i.e. so long as the pressure pistons 30, 32 have not yet been displaced far enough for the holes 54 to have moved completely past the two seals 42 and 46, the pressure built up in the pressure chambers 38, 40 could escape as leakage stream towards the fluid reservoir 14, instead of providing a pressure build-up in the brake circuit. This would delay the effective build-up of a brake pressure in the brake circuit.

In order to combat this effect, the throttle elements 66 are provided. As a consequence of the pressure build-up upon a brake actuation, a pressure rise occurs at the underside of the throttle elements 66 and hence a pressure difference arises between this underside and the unpressurized inner space of the fluid reservoir 14 arises. The result of this pressure difference is that the throttle element 66, which is mounted movably by means of the webs 72 (see FIGS. 5 and 6) on the shank portion 62, is pressed upwards and gives way, so that the clearance 74 is narrowed or closed completely. Thus, depending on the pressure level that is built up in the pressure chambers 38, 40 as a consequence of the actuation of the brake pedal, the throttle element 66 is displaced upwards in FIGS. 1 and 2 as a result of the pressure difference and reduces the size of the surface of the clearance 74. This leads to a considerable throttle effect that prevents brake fluid from flowing back out of the pressure chambers 38, 40 into the fluid reservoir 14. The result of this is that, even if the holes 54 have still not moved completely past the seals 42 and/or 46, a braking-effect pressure is built up faster in the pressure chambers 38, 40 and a return flow of brake fluid out of the pressure chambers 38, 40 may be minimized or entirely prevented. The motor vehicle brake system therefore responds faster because of the throttle elements 66.

As soon as the holes 54 have moved past the seals 42 and/or 46, the effect of the throttle element 66 no longer plays a part in the pressure build-up in the pressure chambers 38, 40. A pressure equalization arises at the throttle element 66, which occupies its initial position shown in FIGS. 1 and 2.

After termination of the brake actuation and release of the brake pedal, the two pressure pistons 30, 32 move back into their initial position under the action of the resetting springs 34, 36. In this case, in a known manner, brake fluid is taken in from the fluid reservoir 14, wherein in a likewise known manner, there is a flow over the seals 42, 46. The throttle elements 66 do not prevent the return flow of brake fluid because as a result of the existing, at most slight pressure difference, the clearance 74 is tendentially enlarged.

If the motor vehicle brake system comprises a traction control system that is disposed in the brake circuit, then the result of activation of the traction control system given an otherwise non-activated brake is that the traction control system by means of a pressure pump for building up a brake pressure takes in brake fluid from the fluid reservoir 14 via the master brake cylinder 10, for example in order to decelerate a spinning drive wheel. In this situation a pressure difference once more occurs at the throttle element 66, wherein a lower pressure arises at the underside of the throttle element 66. This results in the throttle element 66 being moved tendentially downwards in FIGS. 1 and 2 and hence the clearance 74 becomes wider than in its initial state. It is thereby guaranteed that an enlarged flow area arises, with the result that brake fluid may be taken in quickly and with minimal throttle effect from the fluid reservoir 14 and fed via the master brake cylinder arrangement 10 to the motor vehicle brake circuit.

A central advantage of the present invention is that the integrally constructed component 56 combines two functions: on the one hand, it performs the function of receiving, positioning and in particular sealing the connecting socket 24 of the fluid reservoir 14 relative to the master brake cylinder housing 12. The integrally constructed component 56 however also further comprises the throttle element 66 with the previously described mode of operation. This integral construction of the component 56 with the two functions enables a relatively fast and fault-free assembly of the arrangement. The component 56 need merely be pressed into the receiving openings 26 of the master brake cylinder housing 12. When the collar 58 lies against the surface 50 the component 56 is correctly positioned. All that remains is for the fluid reservoir 14 to be pressed in by its connecting socket 24 and anchored by means of the detent ring 77. As soon as this has been done, both functions—sealing and pressure-dependent throttling—are guaranteed.

The component 56 is preferably manufactured from a resilient material. Depending on the configuration of the brake system, the webs 72 are more or less solid, with a greater or smaller material thickness or with a greater or smaller width, in order to reduce or increase the mobility of the throttle element 66 relative to the shank portion 62. Furthermore, as a function of the geometry of the individual components and the desired throttle effect, the effective surface B of the throttle element 66 may be made larger or smaller. The size of this surface also influences the throttle effect.

Figure 3:
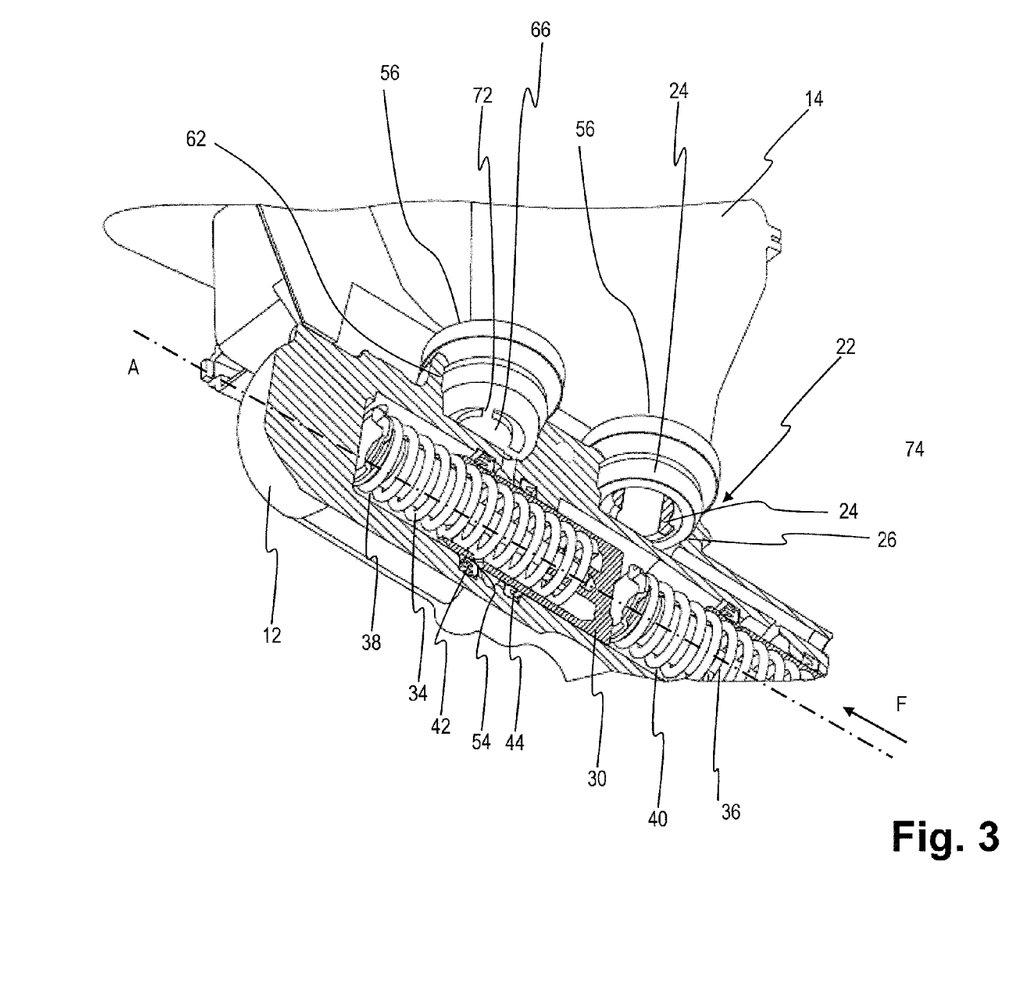
FIG. 3 a perspective, part-sectional detail view of a second embodiment of the invention.
Figure 4:
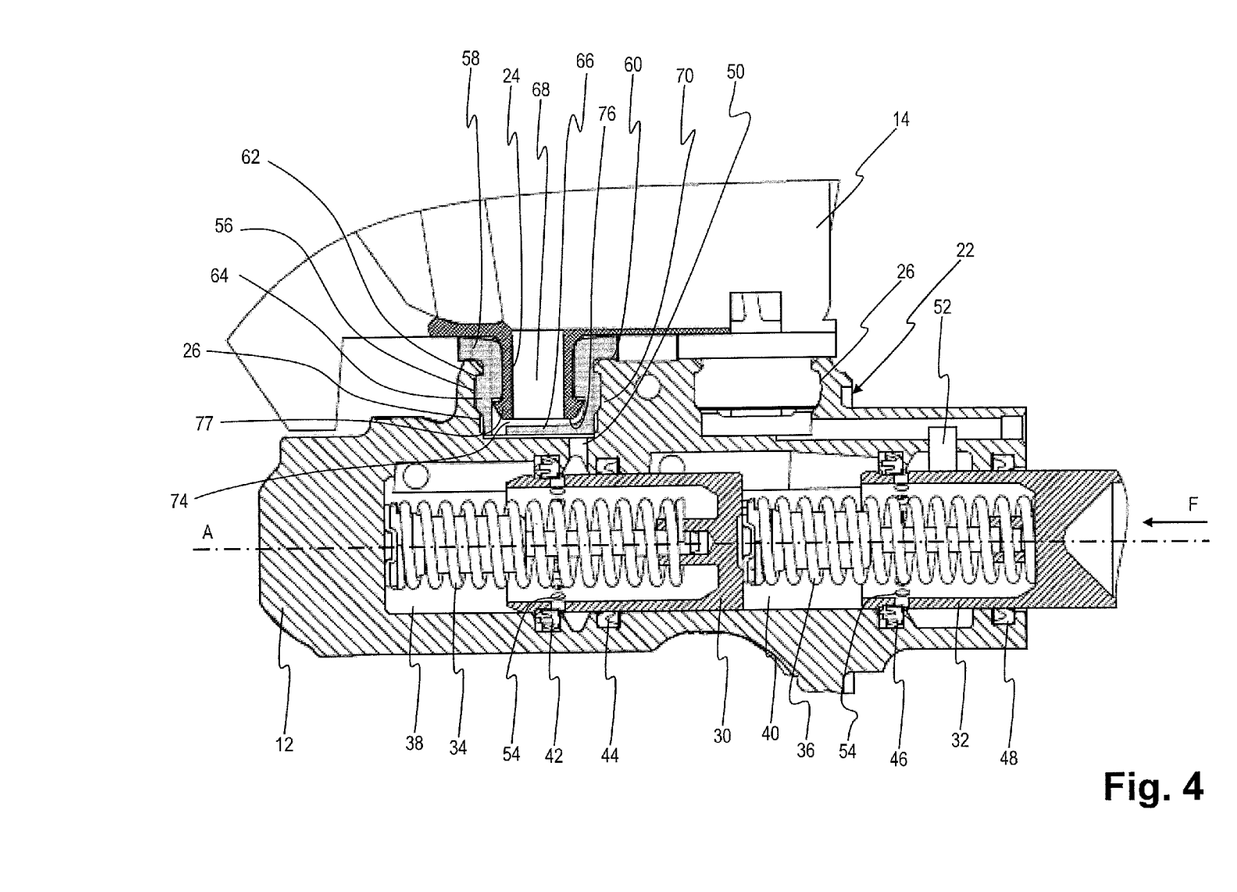
FIG. 4 a view corresponding to FIG. 2 of the second embodiment of the invention.

In FIGS. 3 and 4 an alternative embodiment of the present invention is represented. To avoid repetition and simplify the description, for components of an identical effect or type the same reference characters are used as in the previous description of the first embodiment according to FIGS. 1 and 2.

The sole difference between the embodiment according to FIGS. 3 and 4 and the embodiment according to FIGS. 1 and 2 is that the throttle element 66' is not of a bell-shaped but a planar configuration. Otherwise, however, the mode of operation is substantially the same, wherein it should be noted that with a bell-shaped configuration according to the first embodiment an intensification of the throttle effect may be achieved. It should further be noted that the geometry of the bell shape may be varied.

The invention claimed is:

1. A master brake cylinder arrangement for a motor vehicle brake system comprising:
    a master brake cylinder housing with a cylindrical recess;
    at least one pressure piston which is displaceable and sealingly guided in the cylindrical recess of the master brake cylinder housing; and
    a fluid reservoir which is fluidically coupled by a connecting region to the master brake cylinder housing and which serves for storing brake fluid;
    wherein the at least one pressure piston together with the master brake cylinder housing sealingly encloses a pressure chamber which, as a function of the position of the associated pressure piston, is fluidically connected to or separated from the fluid reservoir,
    wherein furthermore the at least one pressure chamber can be or is fluidically coupled to a fluid circuit of the motor vehicle brake system,
    wherein the fluid reservoir in the connecting region is received, in a manner sealed by means of a sealing element, in a receiving portion of the master brake cylinder housing, and
    wherein at least one throttle element is provided in the connecting region, which throttle element as a function of the pressure conditions in the at least one pressure chamber throttles or derestricts the fluid stream between the fluid reservoir and the at least one pressure chamber through the connecting region,
    wherein the at least one throttle element is permanently attached to the sealing element so as to form an integral structural unit.

2. Master brake cylinder arrangement according to claim 1, wherein the fluid reservoir comprises at least one connecting socket with a through-opening, which connecting socket in the assembled state projects into the receiving portion of the master brake cylinder housing, wherein between the connecting socket and a sealing surface of the receiving portion of the master brake cylinder housing the sealing element is sealingly disposed.

3. Master brake cylinder arrangement according to claim 2, wherein the throttle element comprises a throttle body, which in accordance with the pressure conditions prevailing in its environment is movable relative to the through-opening of the connecting socket.

4. Master brake cylinder arrangement according to claim 1, wherein the throttle element at least partially covers the through-opening of the connecting socket in throughflow direction.

5. Master brake cylinder arrangement according to claim 1, wherein the throttle element in accordance with the pressure conditions prevailing in its environment opens or substantially closes the through-opening of the connecting socket.

6. Master brake cylinder arrangement according to claim 1, wherein the sealing element comprises a collar portion, by which it is supported in a positioning manner on an edge region that surrounds the receiving portion.

7. Integral structural unit comprising at least one throttle element for throttling a fluid stream as well as a sealing element for sealing the interface between a fluid reservoir and a master brake cylinder housing according to claim 1.

8. A master brake cylinder arrangement for a motor vehicle brake system comprising:
    a master brake cylinder housing with a cylindrical recess;
    at least one pressure piston which is displaceable and sealingly guided in the cylindrical recess of the master brake cylinder housing; and
    a fluid reservoir which is fluidically coupled by a connecting region to the master brake cylinder housing and which serves for storing brake fluid;
    wherein the at least one pressure piston together with the master brake cylinder housing sealingly encloses a pressure chamber which, as a function of the position of the associated pressure piston, is fluidically connected to or separated from the fluid reservoir, wherein furthermore the at least one pressure chamber can be or is fluidically coupled to a fluid circuit of the motor vehicle brake system, wherein the fluid reservoir in the connecting region is received, in a manner sealed by means of a sealing element, in a receiving portion of the master brake cylinder housing, and wherein at least one throttle element is provided in the connecting region, which throttle element as a function of the pressure conditions in the at least one pressure chamber throttles or derestricts the fluid stream between the fluid reservoir and the at least one pressure chamber through the connecting region, wherein the at least one throttle element is combined with the sealing element so as to form an integral structural unit, wherein the throttle body is coupled by at least two flexible connecting webs to the sealing element.

9. Master brake cylinder arrangement according to claim 8, wherein the mobility of the throttle body relative to the through-opening of the connecting socket is adjustable by means of the number, geometric design and the material of the connecting webs.

10. Master brake cylinder arrangement according to claim 9, wherein the throttle body is of a disk-shaped or bell-shaped configuration.

11. A master brake cylinder arrangement for a motor vehicle brake system comprising:
- a master brake cylinder housing with a cylindrical recess;
- at least one pressure piston which is displaceable and sealingly guided in the cylindrical recess of the master brake cylinder housing; and
- a fluid reservoir which is fluidically coupled by a connecting region to the master brake cylinder housing and which serves for storing brake fluid;
- wherein the at least one pressure piston together with the master brake cylinder housing sealingly encloses a pressure chamber which, as a function of the position of the associated pressure piston, is fluidically connected to or separated from the fluid reservoir,
- wherein furthermore the at least one pressure chamber can be or is fluidically coupled to a fluid circuit of the motor vehicle brake system,
- wherein the fluid reservoir in the connecting region is received, in a manner sealed by means of a sealing element, in a receiving portion of the master brake cylinder housing, and
- wherein at least one throttle element is provided in the connecting region, which throttle element as a function of the pressure conditions in the at least one pressure chamber throttles or derestricts the fluid stream between the fluid reservoir and the at least one pressure chamber through the connecting region,
- wherein the at least one throttle element is combined with the sealing element so as to form an integral structural unit,
- wherein the structural unit comprising the sealing element and the throttle element comprises an integral, resilient body that is constructed with an annular portion, wherein the annular portion is disposed sealingly between the sealing surface of the receiving portion and the connecting socket.

12. Master brake cylinder arrangement according to claim 11, wherein the sealing surface of the receiving portion is of a profiled construction and that the annular portion has a surface with a complementary profile, wherein the profiled sealing surface of the receiving portion may be moved into engagement or is engaged with the surface of the annular portion with the complementary profile.

13. Master brake cylinder arrangement according to claim 11, wherein the profiled sealing surface of the receiving portion has at least one undercut, into which the surface of the annular portion with the complementary profile engages.

* * * * *